United States Patent [19]

Hermann

[11] 3,813,112
[45] May 28, 1974

[54] VEHICLE SHOCK ABSORPTION SYSTEM AND HIGH-PRESSURE GAS PRODUCING DEVICE THEREFOR

[75] Inventor: Gunter Hermann, Ottobrunn-Riemerling, Germany

[73] Assignee: Messerschmitt-Bolkow-Blohm gesellschaft Mit Beschrankter, Haftung, Germany

[22] Filed: Mar. 21, 1972

[21] Appl. No.: 236,712

[30] Foreign Application Priority Data
Mar. 27, 1971 Germany............................ 2114945

[52] U.S. Cl. ............... 280/150 AB, 23/281, 102/39
[51] Int. Cl. ............................................ B60r 21/08
[58] Field of Search .......... 280/150 AB; 102/31, 32, 102/37.7, 39, 70, 104; 23/281

[56] References Cited
UNITED STATES PATENTS

| 778,788 | 12/1904 | Maxim | 102/39 |
|---|---|---|---|
| 2,043,256 | 6/1936 | McLeod, Jr. | 102/39 |
| 2,561,670 | 7/1951 | Miller et al. | 102/39 |
| 2,667,837 | 2/1954 | Musser et al. | 102/39 |
| 2,869,463 | 1/1959 | McKnight | 102/39 |
| 2,872,870 | 2/1959 | Gey | 102/39 |
| 3,173,370 | 3/1965 | Landry, Jr. et al. | 102/70 R |
| 3,176,615 | 4/1965 | Matthew | 102/38 |
| 3,377,140 | 4/1968 | Hall | 280/150 AB |
| 3,532,359 | 10/1970 | Teague | 280/150 AB |
| 3,711,115 | 1/1973 | Lohr | 102/37.7 |

Primary Examiner—David Schonberg
Assistant Examiner—John P. Silverstrim
Attorney, Agent, or Firm—McGlew and Tuttle

[57] ABSTRACT

A vehicle shock absorption system includes an inflatable casing which is inflated by a pressure-gas producing device when an accident-sensing device indicates that a collision is about to take place. The high-pressure fluid source comprises means for generating high-pressure gases rapidly and for directing them into the casing for inflating it. The gas generating device includes a housing in which there is located an ignitable charge having a rapid combustion rate which is ignited by an accident-sensing device to generate combustion gases which are directed first into association with a solid coolant and then through one or more nozzles for inflating one or more inflatable casings or bags which are adapted to hold a passenger against impact when a collision is likely to occur.

6 Claims, 3 Drawing Figures

3,813,112

VEHICLE SHOCK ABSORPTION SYSTEM AND HIGH-PRESSURE GAS PRODUCING DEVICE THEREFOR

BACKGROUND OF THE INVENTION

1. Field of the Invention

This invention relates in general to vehicle safety systems and, in particular, to a new and useful device for inflating an inflatable casing to support a passenger in a vehicle when a collision impact is about to occur and to an improved device for generating gases under pressure for inflating the casing.

2. Description of the Prior Art

It is a known fact that, when a vehicle collides with a stationary or moving obstacle, each passenger is thrown against objects located in the direction of motion, such as the steering wheel, dashboard, windshield, the back of the front seat, or the like, within an average of 50 milliseconds or less. It has been established that in the case of medium travelling speeds, this can lead to serious, frequently even fatal injuries, unless the vehicle involved in the accident is furnished with one or several shock absorption systems of the kind described in the introduction. The inflatable casing of such a shock absorption system, when appropriately arranged inside the cabin of the vehicle, reduces to a minimum, passenger injuries which might result from collisions, provided the gas source in cooperation with the accident-sensing device completes the inflation process in time.

In a known system using an inflatable bag or casing to hold an occupant of a vehicle in place in the likelihood of a collision, the gas source for inflating the casing consists of nitrogen-filled bottles which are accommodated in the immediate vicinity of the respective inflatable casing inside the passenger compartment of the vehicle. An unavoidable requirement for this type of system, however, is the storage of nitrogen in appropriately designed bottles under high pressure or else the timely inflation of the casing with a volume of gas sufficient to provide adequate protection for the passengers of the vehicle would be in question. The aforementioned conditions have inherent and partly grave disadvantages. Among them are:

a. the additional jeopardy of passengers due to the location of the high-pressure bottles in the vicinity of the respective inflatable casings inside the passenger compartment of the vehicle, as mentioned before, because there is always a possibility, for reasons connected with the flow technique, that the bottles can burst;

b. the temperature dependence of the inflation process due to the nature of the gas source;

c. pressure losses which can practically not be avoided in any high-pressure bottle because of the problem of hermetic sealing and which can, during the statistically relatively long interval between two collision accidents of one and the same vehicle, increase so much that the protectiveness of the shock absorption system is strongly affected or cancelled so that it becomes necessary often to change the high-pressure bottle or bottles.

The disadvantages named under (b) and (c) are found also in another shock absorption system known from the prior art of record, wherein a freezing mixture stored in the liquid state in a bottle, for example a fluo-rine-chlorine-methane compound, is fed in an emergency into an evaporator and subsequently, in the form of vapor, into the inflatable casing.

The foregoing are reasons why a modified shock absorption system which is known from the prior art of record does not employ the combination of a gas-filled high-pressure bottle or a freezing mixture container with evaporator and an inflatable casing. Instead, a zero-pressure or low-pressure gas generator is located inside the casing. During the interval between the beginning of a collision and the resulting movement of the passenger or passengers relative to the vehicle, this gas generator is designed to produce the gas necessary for the inflation of the casing, by means of chemical, electrochemical or pyrotechnical reaction. The evacuation of the ensuing reaction heat is effected indirectly by conducting a liquid or gaseous coolant through ducts provided for the gas-generating medium, and/or through coils of pipe which surround the last-mentioned medium.

There can be no doubt that this type of cooling would prove to be too slow in most cases in order effectively to protect the type of material used for the construction of the inflatable casing in view of the high temperatures suddenly generated during the gas-producing reaction. Also, the accommodation of the necessary heat exchange surfaces inside the available casing is structurally expensive. The same applies naturally to the construction inside the inflatable casing which is provided for the support and transportation of the gas-producing medium and which forms the gas generator. Moreover, the securement of the last-mentioned structural components to the wall of the casing constitutes a considerable mechanical stress to the casing, which is already highly stressed thermally, as mentioned before, and which considerably increases the danger of premature bursting of the casing, thus leading to secondary injuries of the passengers. Finally, it is highly questionable if the zero or low-pressure gas generator, even though it is located inside the casing, can inflate the casing to the volume which is required for adequate protection of the passengers within the time interval between the beginning of the accident and the resulting movement of the passenger or passengers relative to the vehicle, notably because in gas generators of this type, the propagation velocity per unit time of the gas produced is known to be relatively low.

SUMMARY OF THE INVENTION

In accordance with the invention, there is provided a shock absorbing system for holding occupants of vehicles against harmful impact in the event of the likelihood of collision, which includes an inflatable casing which is always reliably inflated when the likelihood of an accident is sensed. The invention provides a solid rocket booster with at least one ignitable charge which burns at a high combustion rate in order to provide a fluid gas underpressure for inflating a casing. The construction includes means for bringing the gas into contact with a solid coolant as it is transported through the booster discharge nozzle for use in inflating an inflatable casing. The invention provides a shock absorption system which is low in initial costs and highly reliable over long periods. By comparison with the systems known from the prior art of record and described elsewhere in detail, the system according to the invention is characterized not only in that inflation of the casing at a sufficiently high speed is always ensured, but also in that the casing is protected from excessive mechanical and thermal stresses. Consequently, secondary injuries to passengers due to bursting gas or vapor-filled high-pressure bottles or containers and bursting casings are out of the question in shock absorption systems constructed according to the invention. These extremely favorable circumstances are the result of substituting according to the invention, for the commonly used gas sources, a solid rocket booster of the type described, and by not using the indirect gas cooling system employing heat exchange surfaces inside the casing, but instead ensuring that the gas temperature is reduced to a value compatible with the casing material before the gas enters the casing, which is achieved by ablative cooling and expansion inside the rocket booster engine or generator nozzle.

For the embodiment of the invention, powder foils in the form of burled disc or helical coil charges are used. As proven by tests, if perfect boosters and combustion chamber damming is provided, these charges have a combustion characteristic that ensures in an emergency the timely inflation of the respective casing with sufficient gas to protect the passengers of a vehicle. Perfect boosting of the charge can be ensured for example if, according to another characteristic of the invention, it is coordinated with an ignition system consisting of an electric bridge igniter, a primary granular charge and a secondary pellet charge. These technical compact.

In a further development of the invention, the above-described ignition system is accommodated in a special area of the combustion chamber housing which is surrounded by and forms part of the inner nozzle ring, wherein the combustion chamber and the "LAVAL" nozzle are of a circular ring shape. Depending on whether the charge is in the form of a burled disc or helical coil charge, overload bores or the like lead from the area accommodating the ignition system to the inner charge surface or to the nozzle-end front surface of the charge. Tlse technical measures which are structurally easy to put into practice allow the construction of a shock absorption system which is highly reliable over an unlimited period of time and which is also especially ompact. This last-mentioned fact is of special advantage for the installation of this system at appropriate points inside the motor vehicle, such as the steering wheel and dashboard of a passenger vehicle.

In order to achieve intense ablative cooling of the gases produced in an emergency by the charge before it enters the respective casing, it is expedient to accommodate a solid coolant in recesses on the charge side of the outer and/or inner nozzle ring and to provide inside the outer nozzle chamber at least one distributor plate with a plurality of bores, slots or the like opposite the solid coolant.

A further acceleration of the cooling rate can be achieved if, instead of the traditional direct damming of the engine nozzle, an intermediate damming is used which accelerates the decomposition of the coolant. In accordance with another characteristic of the invention, the distributor plate or plates are designed so as to carry the intermediate damming which may consist of aluminum foil or nitro-film material.

If, as in an embodiment of the shock absorption system in accordance with the invention, the only object in the area between charge and engine nozzle is a distributor plate of the aforementioned kind, the support of the damming should preferably, for reasons connected with the flow technique, be located on the charge side of the plate, rather than on the nozzle side. A construction in which the damming is located between two distributor plates and where these three elements are combined into one structural unit, has proved especially successful.

At times it is expedient to provide between charge and damming carrier at least one spacer, especially if in the absence of such a spacer or spacers, due to the geometry of the combustion chamber, the damming carrier obstructs the overload bores or the like which lead from the ignition system to the charge, thus impeding the ignition of the charge.

Accordingly, it is an object of the invention to provide an improved shock absorption system for sustaining occupants of vehicles against injury in the likelihood of a vehicle collision which comprises an inflatable casing which is inflated by a rocket booster engine having an ignitable solid charge which is ignited upon the sensing of a likelihood of an accident or that an accident is about to occur and which burns rapidly to generate gases to inflate the casing and which includes means for cooling the gases before they are delivered to inflate the casing.

A further object of the invention is to provide an apparatus for inflating the shock absorbing casing rapidly which includes the solid rocket booster cast generator comprising a housing having a solid charge therein which is ignitable by the sensing device to generate gases which are first directed into association with a coolant and then discharged through a nozzle.

A further object of the invention is to provide a safety device for vehicles and a device for inflating a shock absorbing casing which are simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated preferred embodiments of the invention.

GENERAL DESCRIPTION OF THE PREFERRED EMBODIMENTS

Figure 1:
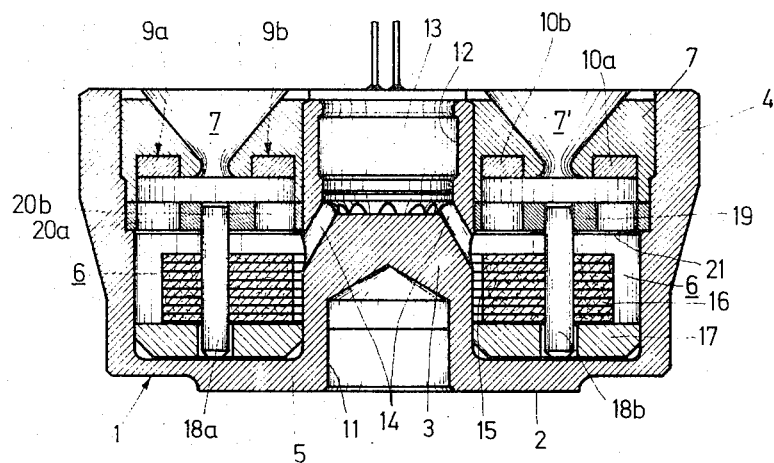
FIG. 1 is a transverse view of a device for rapidly generating pressure gases for inflating a shock-absorbing casing.
Figure 2:
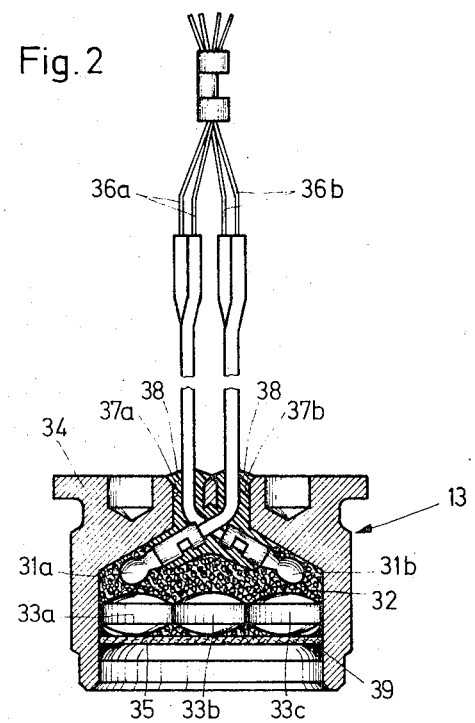
FIG. 2 is an enlarged transverse sectional view of the ignition system used for the device of FIG. 1.
Figure 3:
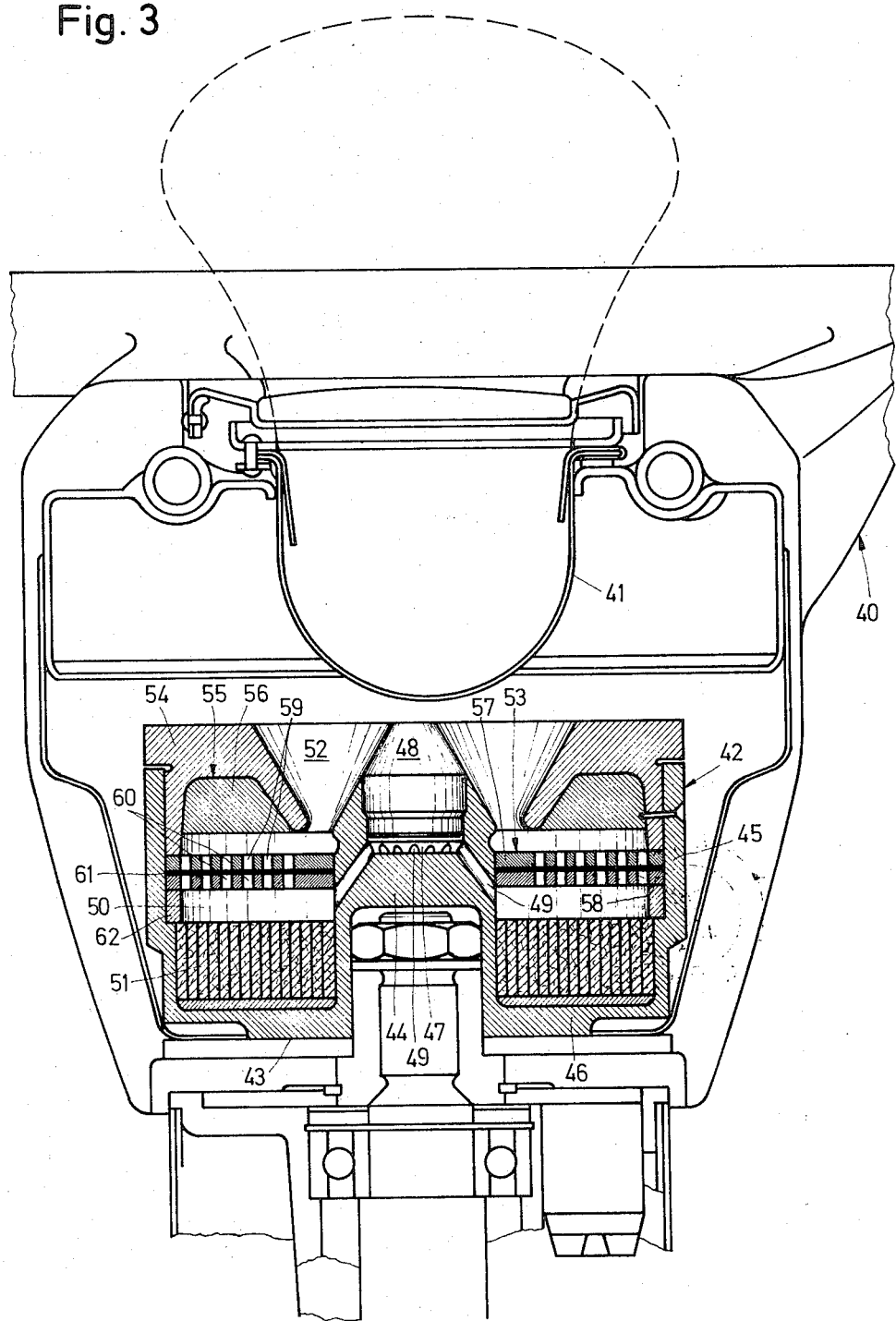
FIG. 3 is a schematic partial sectional view of a shock absorption system installed on a motor vehicle.

Referring to the drawings in particular, the invention embodied therein in FIGS. 1 and 2 comprises, a solid rocket booster or gas generator, generally designated 1, which provides a high-pressure fluid source for the rapid inflation of an inflatable casing of a shock absorption system, for example of a type which is shown in more detail in the embodiment of FIG. 3. The rocket booster 1 includes a housing 2 having a central core which projects upwardly from a base 5 at the interior of the housing and which is coaxially arranged within an outer cylindrical wall 4. An annular chamber 6 is defined within the housing below a ring-shaped nozzle member 7. The nozzle member 7 has a plurality of thrust nozzle portions which are advantageously arranged concentrically around the member and which provide a discharge for the gases which are generated and which are delivered to the shock absorption system for the vehicle. The interior face of the nozzle member 7 is provided with concentrically arranged and spaced annular grooves 9a and 9b which are filled with a solid coolant 10a and 10b, respectively. The ring member 7 is advantageously threaded into the housing wall 4 at its outer periphery and at its inner periphery, it is threaded over the core 3. The base 5 is provided with an indentation or recess 11 and the core 3 is provided with a top recess 12 which accommodates an ignition system 13. The space within the bore 12 is provided with a plurality of overload bores 14 which extend downwardly into the annular chamber 6 to the inner surface of a solid charge 16 which is accommodated therein. The charge 16 is supported on an annular plate 17 and it is secured against rotation by means of two diametrically opposite locking pins 18a and 18b which extend through the charge and into the ring 17. The charge 16 may advantageously be a burled disc charge made of a powder foil, type D 470, V 172, or the like.

In accordance with a feature of the invention, a distributor plate 19 which accommodates the other end of the pins 18a and 18b is located within the annular space 6 between the nozzle member 7 and the charge 16. The distributor plate includes bores 20a and 20b which are located on two concentric partial circles in locations to ensure that the gases which are generated by the ignition of the charge 16 flow first into direct contact with the solid coolants 10a and 10b. This means that the gases which are generated move into contact with the coolants before they are discharged through the nozzles 7'. The pins 18 also hold the distributor plate 19 against rotation. The distributor plate 19 serves as a carrier for a damming 21 which for example may comprise aluminum foil.

The ignition system shown in FIG. 2 and generally designated 13, comprises at least one electric bridge igniter having, for example two pellets 31a and 31b of a primary granular charge 32 of, for example, 0.5p and a secondary pellet charge consisting of, for example, 7 pellets, 33a, 33b, 33c, 33d, 33e, 33f and 33g. Three of these pellets, 33a, 33b and 33c are shown in the drawing. The electric pellets 31a and 31b, the primary granular charge 32, and the secondary pellet charge 33a, b, c, etc., are accommodated in a capsule or housing 34. On the side of the capsule 34 which is adjacent to the overload bores 14 when it is installed in the housing core 3, shown in FIG. 1, the capsule is covered by a powder foil 39 of a type H 518 which is attached below the pellets 33a, 33b, 33c, etc., by means of adhesive. The secondary pellets 33a, 33 b, 33c, etc., and the primary granular charge 32, within which the pellets 31a and 31b are embedded, are supported thereon. Electrical supply conduits 36a and 36b are conducted through bores 37a l and 37b which are located on the capsule wall opposite to the powder foil 35 and they are fixed in the bores 37a and 37b by means of a flexible binder 38.

The complete shock absorption system for a vehicle is shown in FIG. 3 in respect to an inflatable casing 41 which is installed in a space within a steering wheel 40, for example centrally in the hub portion. In this embodiment, a solid rocket booster or gas generator provides the fluid pressure source for filling the casing 41 so that it projects forwardly against a passenger and holds him in position in the likelihood of an accident. The booster 42 includes a housing 43 having a central core 44 and an outer jacket or wall 45 which is concentric with the core. The base 46 is provided with a central recess at its bottom end at the location of the core 44. The core 44 includes a hollow portion or recess 47 for the accommodation of an ignition system 48 which is similar to that described in FIG. 2. Overload bores 49 lead from the ignition system cavity 47 into the combustion chamber 50 which is defined around the core 44. This much of the rocket booster 42 corresponds to the rocket booster shown in FIG. 1. In this embodiment, however, the charge 51, the nozzle 52 and the damming carrier are structurally different from the showing in FIG. 1.

Instead of using a burled disc charge for example, a burled helical coil charge 51 comprises a powder foil. The charge 51 is ignited not at its inner surface, but at its nozzle side front surface, so that the overload bores 49 are of a different construction from that shown in FIG. 1.

A nozzle plate member 54 of ring configuration includes individual "Laval" nozzles 52 and it is detachably connected to the housing jacket 45. The nozzle ring 54 includes an interior face having an annular slot 55 which is filled with a solid coolant 56.

The damming carrier 53 of the rocket booster 42 comprises two distributor plates 57 and 58 having a plurality of bores 59 and 60 which are located opposite to the solid collant 56 and which guide the gases produced by the burning of the helical coil charge 51 past the solid coolant 56 as they move toward the nozzle 52. The damming which may comprise nitro-film material and which is shown at 61 is located in between the two distributor plates 57 and 58 and form a unit therewith. On the charge side of the damming carrier 53 there is a spacer 62, which due to its geometry, ensures that the space between the helical coil charge 51 and the damming carrier 53 is sufficient so that it does not impede the ignition of the helical coil charge 51 on its nozzle side surface.

While specific embodiments of the invention have been shown and described in detail to illustrate the application of the principles of the invention, it will be understood that the invention may be embodied otherwise without departing from such principles.

What is claimed is:

1. In a shock absorbing system including an inflatable casing for holding and supporting a vehicle occupant against impact in an impending collision, the improvement comprising a generator for producing gas under pressure to inflate the casing including a generator housing having an interior gas generating chamber with at least one discharge nozzle having axially adjacent convergent and divergent walls and a discharge adapted to be connected to the casing to be filled, an ignitable rocket propellant charge in said housing having a rapid combustion speed, means for igniting said charge to generate high-pressure combustion gases in said housing for flow through said nozzle to the casing to inflate the casing, and a solid coolant associated with said housing having a surface located in the path of flow of the gases over which the gases flow for cooling the gases which are generated, said generator housing including a ring-shaped gas generating chamber, said housing having a central core with a recess accommodating said ignition means, and overload bores defined in said core from said recess accommodating said ignition means and extending into said gas generating chamber, said combustion charge comprising a burled disc charge, the overload bores leading to the inner surface of said charge.

2. In a shock absorbing system including an inflatable casing for holding and supporting a vehicle occupant against impact in an impending collision, the improvement comprising a generator for producing gas under pressure to inflate the casing including a generator housing having an interior gas generating chamber with at least one discharge nozzle having axially adjacent convergent and divergent walls and a discharge adapted to be connected to the casing to be filled, an ignitable rocket propellant charge in said housing having a rapid combustion speed, means for igniting said charge to generate high-pressure combustion gases in said housing for flow through said nozzle to the casing to inflate the casing, and a solid coolant associated with said housing having a surface located in the path of flow of the gases over which the gases flow for cooling the gases which are generated, said generator housing including a ring-shaped gas generating chamber, said housing having a central core with a recess accommodating said ignition means, and overload bores defined in said core from said recess accommodating said ignition means and extending into said gas generating chamber, wherein said charge comprises a burled helical coil charge, the overload bores leading to the fact of said charge facing said nozzle.

3. In a shock absorbing system including an inflatable casing for holding and supporting a vehicle occupant against impact in an impending collision, the improvement comprising a generator for producing gas under pressure to inflate the casing including a generator housing having an interior gas generating chamber with at least one discharge nozzle having axially adjacent convergent and divergent walls and a discharge adapted to be connected to the casing to be filled, an ignitable rocket propellant charge in said housing having a rapid combustion speed, means for igniting said charge to generate high-pressure combustion gases in said housing for flow through said nozzle to the casing to inflate the casing, and a solid coolant associated with said housing having a surface located in the path of flow of the gases over which the gases flow for cooling the gases which are generated, wherein said housing includes an end wall having said discharge nozzle, said end wall having an interior recess, said coolant being located within said recess facing said charge.

4. A device for generating high-pressure gases particularly for use in inflating a shock absorption system casing, comprising a housing having a discharge end wall adapted to be connected to the casing with at least one nozzle therein with convergent and divergent walls for the discharge of gases which are generated, a solid charge inside said housing of an ignitable material having a high combustion rate, an ignition charge in said housing for igniting said solid charge, and a solid coolant carrier in said housing opposite to said charge in a position to be contacted on its surface by the gases which are generated as they flow through said thrust nozzle, said housing including a central core having a recess defining an igniting charge compartment, the space around said core and between said core in the outer walls of said housing defining an annular solid charge combustion chamber, a solid charge positioning in said combustion chamber, passage means defined between said ignition charge chamber and said combustion charge chamber, and an ignition charge in said ignition charge chamber, said housing wall having said thrust nozzle having an interior recess and said solid coolant being accommodated within said recess.

5. A device for generating high-pressure gases, according to claim 4, including a distributor plate in said combustion chamber between said solid coolant and said solid charge and having a passage means defined therethrough for directing the gases which are generated by ignition of said solid charge into associated with said coolant before they have moved out through said thrust nozzle.

6. A device for generating high-pressure gases, according to claim 5, including a plurality of thrust nozzles defined in said end wall of said housing.

* * * * *